A. W. BENJAMIN.
WHEEL.
APPLICATION FILED JAN. 16, 1918.

1,318,475.

Patented Oct. 14, 1919.
2 SHEETS—SHEET 1.

WITNESSES

INVENTOR
ALBERT W. BENJAMIN
BY
Featherstonhaugh & Co.
ATTYS.

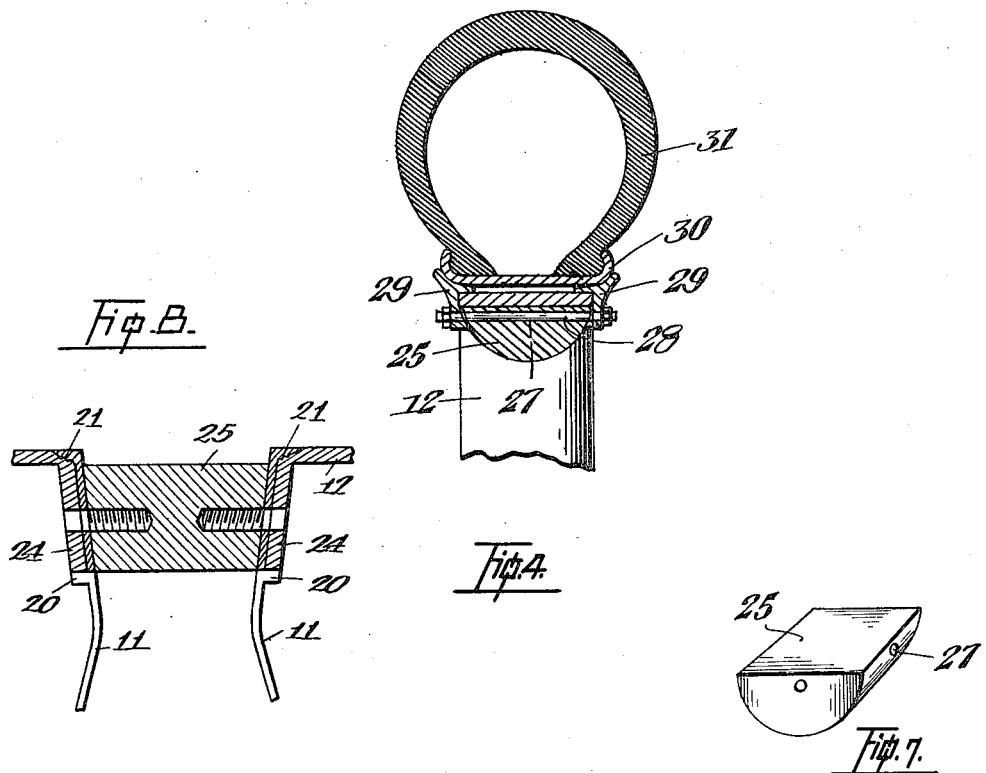

UNITED STATES PATENT OFFICE.

ALBERT WESLEY BENJAMIN, OF YARKER, ONTARIO, CANADA.

WHEEL.

1,318,475.  Specification of Letters Patent.  Patented Oct. 14, 1919.

Application filed January 16, 1918. Serial No. 212,138.

*To all whom it may concern:*

Be it known that I, ALBERT WESLEY BENJAMIN, a subject of the King of Great Britain, residing at Yarker, Province of Ontario, Dominion of Canada, have invented certain new and useful Improvements in Wheels, of which the following is a specification.

This invention relates to improvements in wheels, and the objects of the invention are to provide a true suspension wheel capable of being used on vehicles generally and in which there will be no appreciable deflection of the wheel when under load, to eliminate any liability of collapse even under the most severe running conditions, and to give to the wheel the desired resiliency, so that jarring will not take place.

Further objects still are to give to the wheel shock absorbing qualities so that when this wheel is used in automobile practice the tire may be inflated to the degree stated by the manufacturers and it is not necessary to run with the tire slightly flattened to obtain the shock absorbing effect, so that the life of the tire is thus increased.

Further objects still are to permit of the spokes of the wheel being tensioned to the desired extent so that they will be better able to perform the functions required of them, to facilitate assembling the wheel, to give to the wheel a longer life and generally to adapt the several parts to better perform the functions required of them.

With the above and other objects in view, the invention consists essentially of the improved construction particularly described and set forth in the following specification and accompanying drawings forming part of the same.

In the drawings:

Fig. 4 is a fragmentary transverse section through the tire and rim of the wheel.

Fig. 5 is a fragmentary perspective view of the hub of the wheel.

Fig. 6 is a perspective view of one of the keys.

Fig. 7 is a perspective view of a spacing block.

Fig. 8 is a sectional view of a detail of construction.

Like characters of reference refer to like parts in the several figures.

Figure 1:
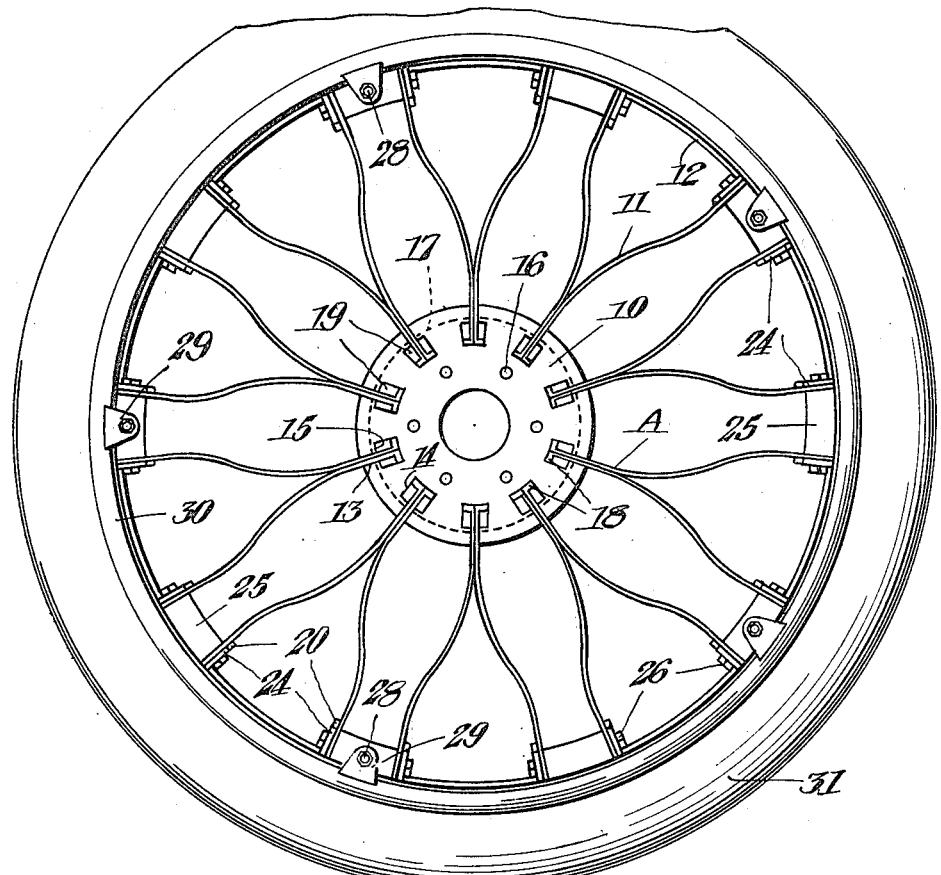
Figure 1 is a side elevation of the improved wheel as adapted to automobile use.
Figure 2:
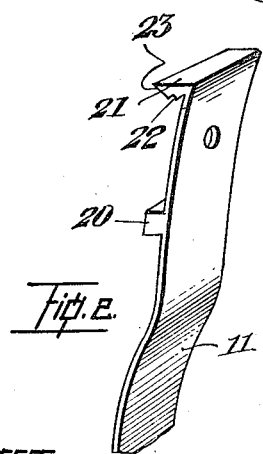
Fig. 2 is a fragmentary perspective view of the outer end of one of the spokes.
Figure 3:
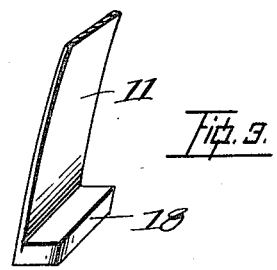
Fig. 3 is a fragmentary perspective view of the inner end of one of the spokes.

Referring to the drawings, A represents the improved wheel comprising the hub 10, spokes 11 and rim 12 designed to be assembled in a manner to be made clear hereinafter.

The hub 10 is preferably made solid and cast, but of course it may be pressed out of metal, should such be found necessary or advisable in manufacture, and the said hub is provided with a plurality of peripheral recesses 13 extending radially inwardly and terminating in enlarged rectangular or like recesses 14, the outer walls of which form with the peripheral recesses 13 suitable shoulders 15.

The hub is also provided with a plurality of orifices 16 by means of which the cover 17 is secured in position and prevents lateral displacement of the spokes 11.

The spokes are provided at their inner ends with offset portions 18 designed to be received by the recesses 14, and the spokes are arranged in pairs so that the adjacent faces of each pair abut at the inner end and the offset portions 18, when located in the recesses 14 are designed to be engaged by the keys 19 which lock the spokes in position.

Each pair of spokes diverges toward the rim and each spoke thereof is formed curvilinearly intermediate of its length, while its outer end is inclined to be straight being provided on the outer wall and adjacent to the outer end with a projection 20, while the outer end is offset as shown at 21 and provided with a V-shaped recess 22 in the under face, which is beveled toward the outer edge, as shown at 23.

The spokes pass through the rim 12 which is provided with radially extending flanges or lugs 24 designed to engage with the projection 20 and so prevent longitudinal motion of the spokes, while the offset end 21 of the spoke engages with the outer periphery of the rim 12, so that the spoke is held securely fixed at the outer end.

The adjacent spokes of each pair are held in spaced relation at the outer end by means of the block 25 which is inserted therebetween, and these blocks are held in position by set screws 26 which pass through the lugs 24 and are threaded into the blocks.

Every intermediate block is provided with a transversely extending orifice 27, through which the bolt 28 passes, the said bolt being adapted to secure the clips 29 in position and engage the outer edge of the demountable rim 20 carrying the tire 31.

Although this wheel is here illustrated as being of that type adapted to carry a demountable rim, it will be understood that the wheel may be of any type whatever, as the arrangement of the spokes and hub and method of attaching the outer end of the spokes to the rim, will in all cases be the same.

In assembling the wheel, the spokes 11 are engaged at the outer end with the rim 12, so that the offset end 21 will snugly engage with the rim and the inner end of the spokes are then engaged with the peripheral recess 13 and the enlarged recess 15.

The blocks 25 are now inserted between the spokes engaged by adjacent lugs 24, and the set screws 26 are threaded into position. It will be readily understood that the inner end of the spokes 11 are engaged with the recesses 13 and 15 by moving the hub 10 laterally and when the spokes are in position, the keys 19 are driven between the outer walls of the enlarged recess 15 and the offset end 18, so giving to the spoke the desired tension, and pulling them up solid against the inner wall of the recess 14.

In this way each spoke 11 is tensioned to the same extent with the result that a true suspension wheel is obtained.

When this wheel is mounted on an axle, and the cover 17 placed over the end of the axle and secured to the hub 10 by means of bolts, there is no possibility of the spoke 11 becoming displaced laterally and so disconnected from the recess 14 in the hub.

When the load is brought to bear upon the wheel there is no appreciable deflection, and the resiliency of the spokes give to the wheel the desired resiliency and at the same time act as shock absorbers, damping down any undue jarring or shock which would otherwise take place when rough roads are being traversed.

What I claim as my invention is:

A wheel comprising a hub, a rim, pairs of spokes extending from the hub to the rim, substantially right angled tapered edge extensions on the rim ends of the spokes, said extensions being oppositely directed on units of pairs of the spokes with transverse corrugations on the face away from the rim, lugs on the rims, projections on the spokes engaging the lugs, and distance pieces secured between the spokes at the outer ends.

In witness whereof I have hereunto set my hand.

ALBERT WESLEY BENJAMIN.

Copies of this patent may be obtained for five cents each, by addressing the "Commissioner of Patents, Washington, D. C."